(No Model.)
A. MONTANT.
VISE.
No. 300,388. Patented June 17, 1884.
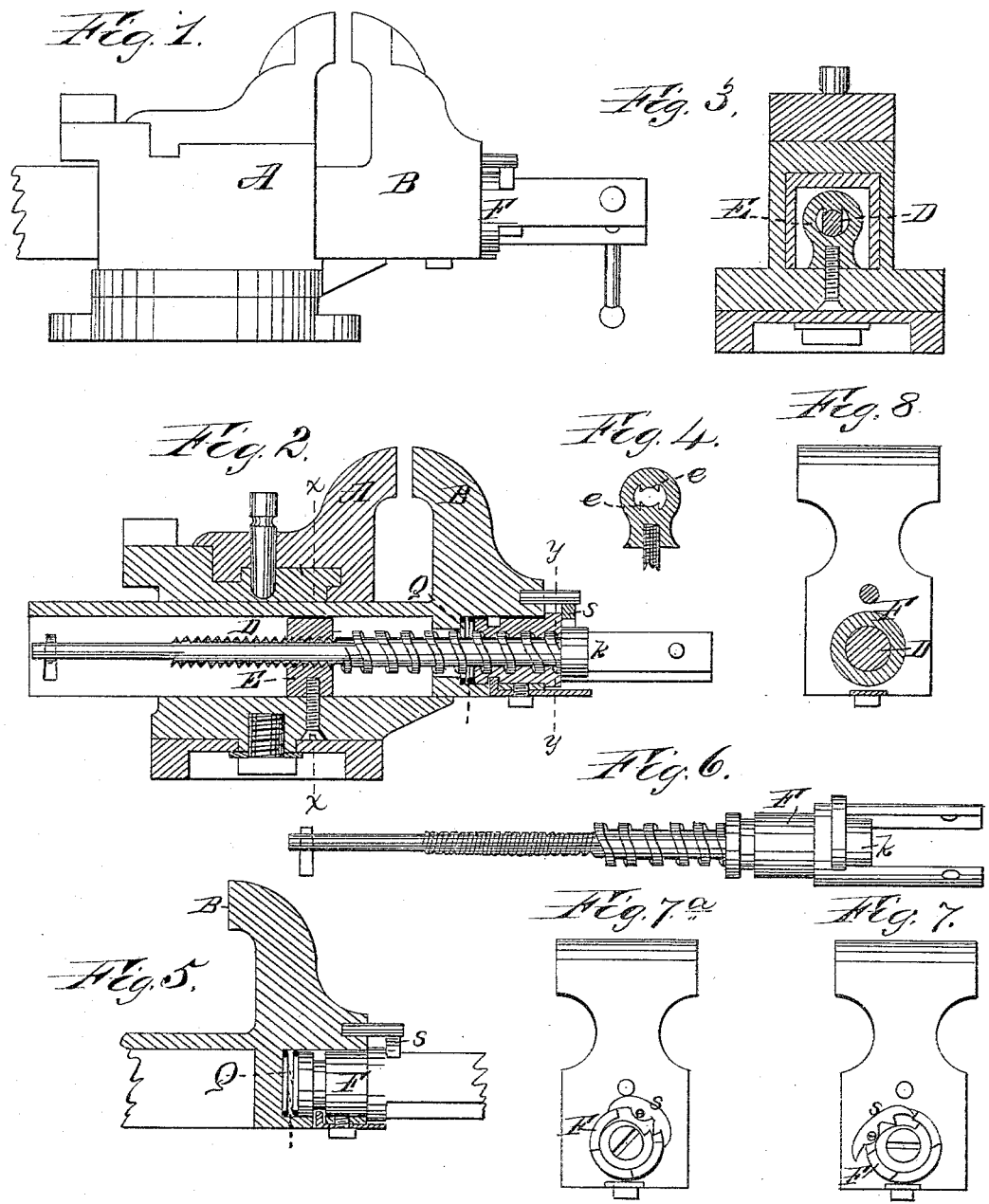
WITNESSES:
G. W. Barretto
W. L. Bennem
INVENTOR
Alphonse Montant

UNITED STATES PATENT OFFICE.

ALPHONSE MONTANT, OF NEW YORK, N. Y.

VISE.

SPECIFICATION forming part of Letters Patent No. 300,388, dated June 17, 1884.

Application filed May 11, 1882. (No model.)

*To all whom it may concern:*

Be it known that I, ALPHONSE MONTANT, of the city, county, and State of New York, have made an invention of a new and useful Improvement in Vises; and I do hereby declare that the following is a full, clear, and exact description and specification of the same.

My present invention especially relates to improvements in vises such as described in the specification and drawings annexed to Letters Patent of the United States granted to me, bearing date on or about December 13, 1881, and numbered 250,673, to which reference may be had.

The accompanying drawings form part of this specification, and describe what I consider the best means of carrying out the invention.

Figure 1 of said drawings represents the said vise. Fig. 2 represents a central section of the same crosswise of the faces of the jaws, and with the screw in elevation. Fig. 3 represents a transverse section of the vise at the line $x\, x$ of Fig. 2. Figs. 4 to 8, inclusive, represent various details of the vise.

In each of the views similar letters of reference indicate corresponding parts wherever they occur.

In my aforesaid Letters Patent I showed how, by the use of the sectional nut and a sectional screw, D, the movable jaw B of a vise could be "locked" to the stationary jaw A. In said patent I used an ordinary right-handed screw-thread. The locking action not only held the sliding jaw from backward movement away from the fixed jaw, but also pressed the sliding jaw slightly toward the fixed jaw, gripping any object placed between them. This locking action, if too rapidly or carelessly done, would be injurious to the threads of the screw and nut, as said thread may not have an opportunity of engaging completely but only at the edge, making an incomplete "lock."

My present invention therefore consists of the use, in the sectional nut E and sectional screw D, of threads either running straight across in a line parallel to the jaws or having a pitch contrary to that now in common use—what is known as a "left-handed screw"—as shown at D, Fig. 6. The object of this is to enable the sectional screw D and nut E to be completely engaged or locked before the action of the turning-nut F (as described in my previous patent) moves the sliding jaw B with great force against any object placed between the jaws. By this arrangement the pawl s (whose action is fully described in the aforesaid patent) can be better dispensed with and friction alone or spring-pressure depended on to force the engagement of the sectional screw D and sectional nut E when the turning-nut F is revolved, and it is in order to allow friction to act in advance of the pawl s, when a pawl is used, that it is advantageous to set the pawl somewhat away from the notch in the screw-head $k$, as shown in Fig. 7. Besides, to overcome any rigidity of parts and facilitate the "locking" action, a spring, Q, is placed between the end of the turning-nut F, and the bottom of the socket made to receive said nut in the moving jaw at the point marked in dots in Figs. 2 and 5, where some play is also allowed, as the locking action is rendered easier when the screw and nut are loosely attached to movable jaw B, the threads of the sectional screw sliding more easily into the spaces between the threads $e$ of the nut E.

I claim as my invention—

1. The combination of the jaws, a sectional nut in the stationary jaw, a screw partly sectional and partly entire in the movable jaw, the sectional threads of the two being arranged in a direction other than that of the entire threads, and a turning-nut whereby the sectional screw and nut are locked without advancing the movable jaw, substantially as hereinbefore set forth.

2. The combination of the vise-jaws with a section-nut and a locking-screw which has its threads reversed in pitch with the turning-nut, substantially as before set forth.

3. The combination of the stationary jaw carrying the sectional nut, the sectional screw, the turning-nut, the movable jaw, and a spring located between said nut and jaw, substantially as hereinbefore set forth.

Witness my hand this 9th day of May, A. D. 1882.

ALPHONSE MONTANT.

Witnesses:
G. M. BARRETTO,
W. L. BENNEM.